United States Patent
Nakai

(10) Patent No.: US 9,686,425 B2
(45) Date of Patent: Jun. 20, 2017

(54) IMAGE FORMING APPARATUS, METHOD FOR CONTROLLING IMAGE FORMING APPARATUS, AND RECORDING MEDIUM

(71) Applicant: CANON KABUSHIKI KAISHA, Tokyo (JP)

(72) Inventor: Hironobu Nakai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/987,030

(22) Filed: Jan. 4, 2016

(65) Prior Publication Data
US 2016/0205274 A1    Jul. 14, 2016

(30) Foreign Application Priority Data
Jan. 8, 2015 (JP) .................................. 2015-001962

(51) Int. Cl.
*H04N 1/00* (2006.01)
*H04N 1/32* (2006.01)

(52) U.S. Cl.
CPC ....... *H04N 1/00204* (2013.01); *H04N 1/0032* (2013.01); *H04N 1/00042* (2013.01); *H04N 1/00899* (2013.01); *H04N 1/32032* (2013.01); *H04N 2201/0094* (2013.01)

(58) Field of Classification Search
None
See application file for complete search history.

(56) References Cited

U.S. PATENT DOCUMENTS

2004/0024865 A1* 2/2004 Huang ................ H04L 41/0604
709/224
2007/0124440 A1* 5/2007 Maki ....................... H04L 12/12
709/223

(Continued)

FOREIGN PATENT DOCUMENTS

JP    2002-297336 A    10/2002
JP     2013-9139 A      1/2013

OTHER PUBLICATIONS

D. Harrington Enterasys Networks R. Presuhn, An Architecture for Describing Simple Network Management Protocol (SNMP) Management Frameworks, Lucent Technologies Dec. 2002 https://www.ietf.org/rfc/rfc1157.txt.

(Continued)

*Primary Examiner* — Fan Zhang
(74) *Attorney, Agent, or Firm* — Canon U.S.A., Inc. IP Division

(57) ABSTRACT

An image forming apparatus that shifts to a plurality of power states includes a notification unit that notifies, in a case where a power state of the image forming apparatus is shifted, a predetermined notification destination of the power state, a first setting unit that sets, as a notification method by the notification unit, a first notification method in which a reach confirmation is performed or a second notification method in which a reach notification is not performed, and a control unit that performs, in a case where the power state of the image forming apparatus is shifted to a specific power state, control of a notification by the notification unit in such a manner that a notification by the first notification method set by the first setting unit is switched to a notification by the second notification method.

3 Claims, 9 Drawing Sheets

(56) References Cited

U.S. PATENT DOCUMENTS

2010/0150170 A1\* 6/2010 Lee ................... H04L 41/0213
370/466
2013/0330074 A1\* 12/2013 Kikuzawa ............... H04L 12/12
398/38

OTHER PUBLICATIONS

The Printer Working Group, PWG Imaging System MIB V1.0, Feb. 14, 2011, Candidate Standard 5106.5-2011 http://ftp.pwg.org/pub/pwg/candidates/cs-wimspowermib10-20110214-5106.5.pdf.
J. Case SNMP Research, A Simple Network Management Protocol (SNMP), Network Working Group, May 1990, MIt Laboratory for Computer Science, http://www.rfc-editor.org/std/std62.txt.

\* cited by examiner

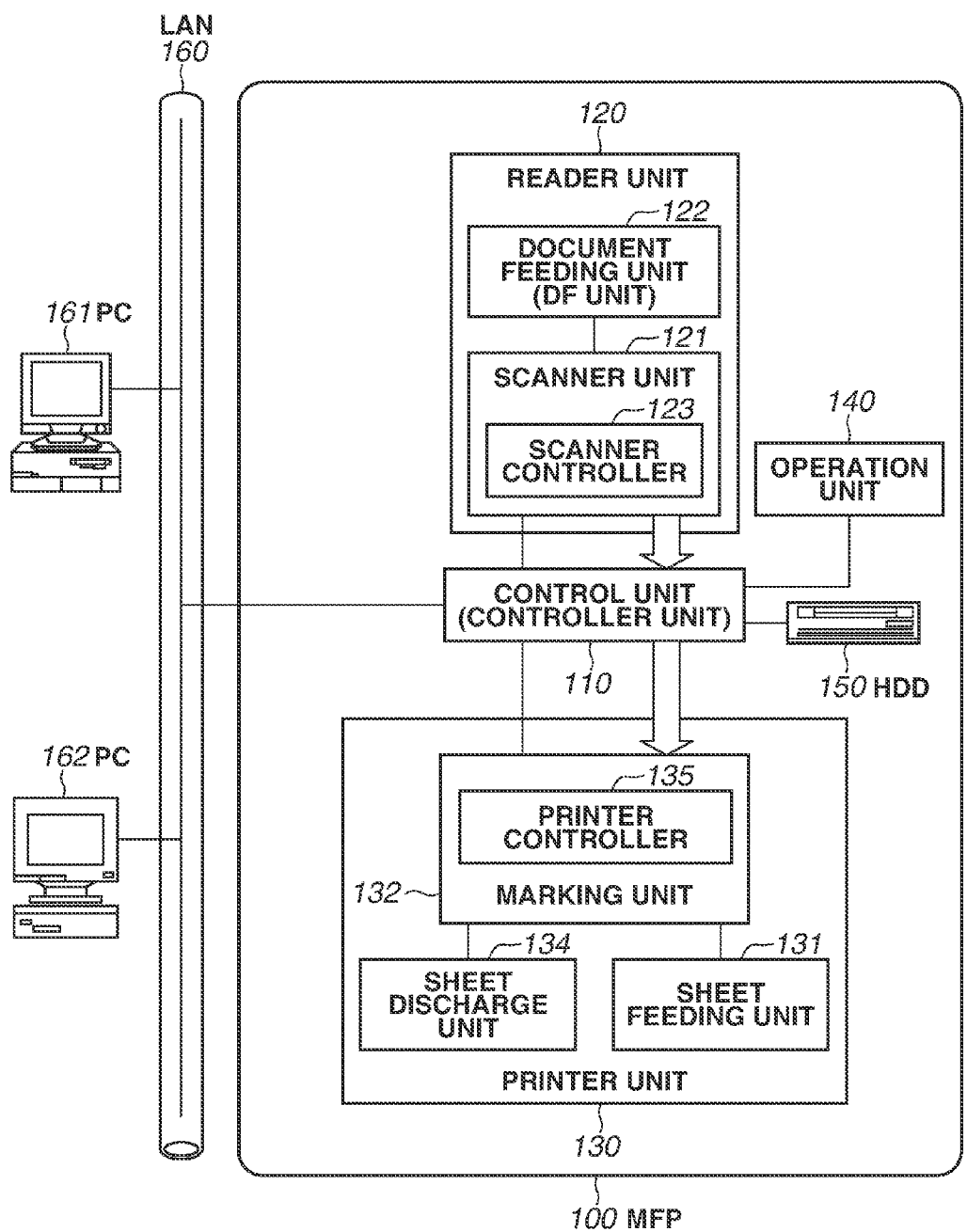

DIFFERENCE BETWEEN NOTIFICATION
METHODS USING trap AND inform

CASE OF trap

CASE OF inform

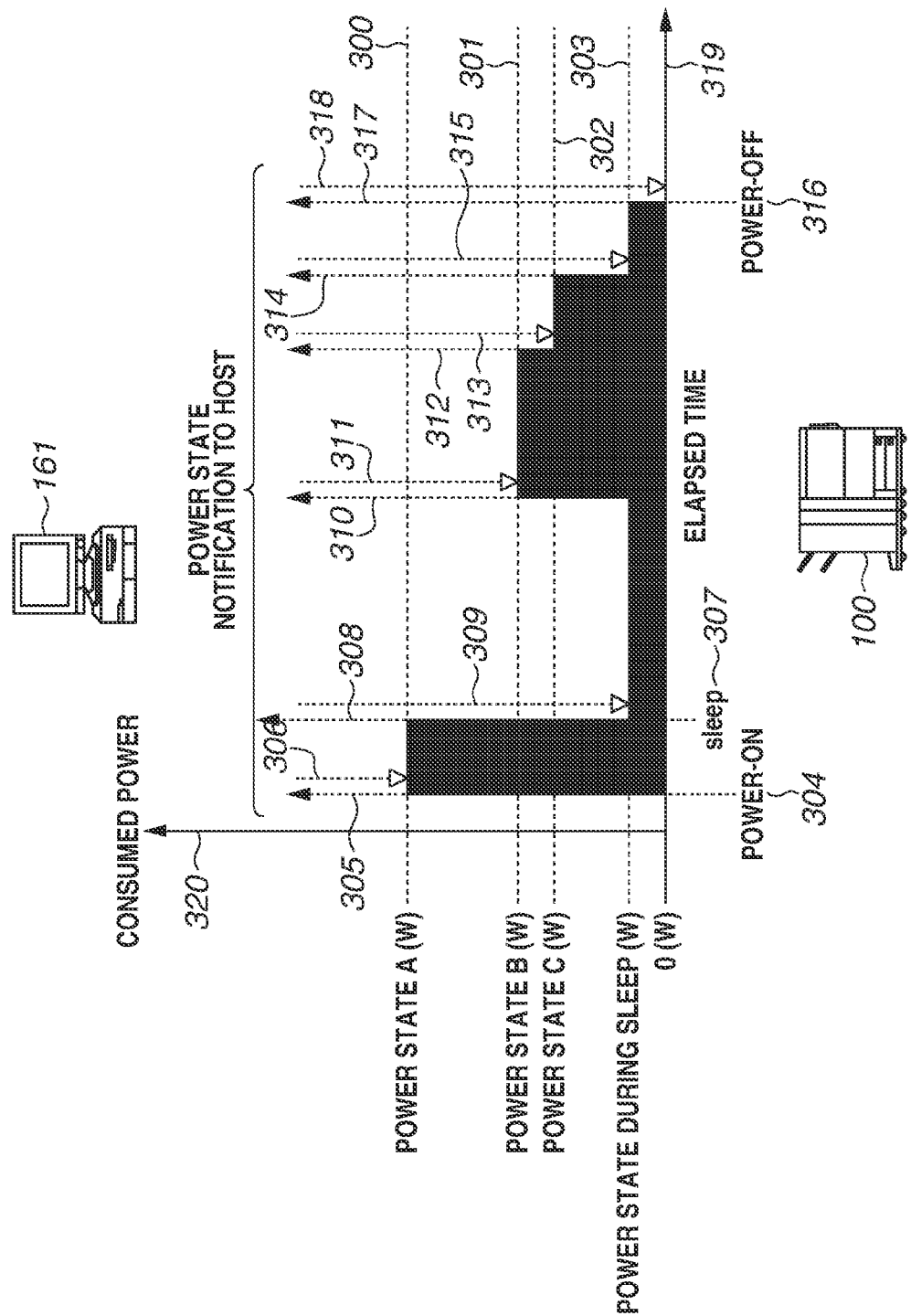

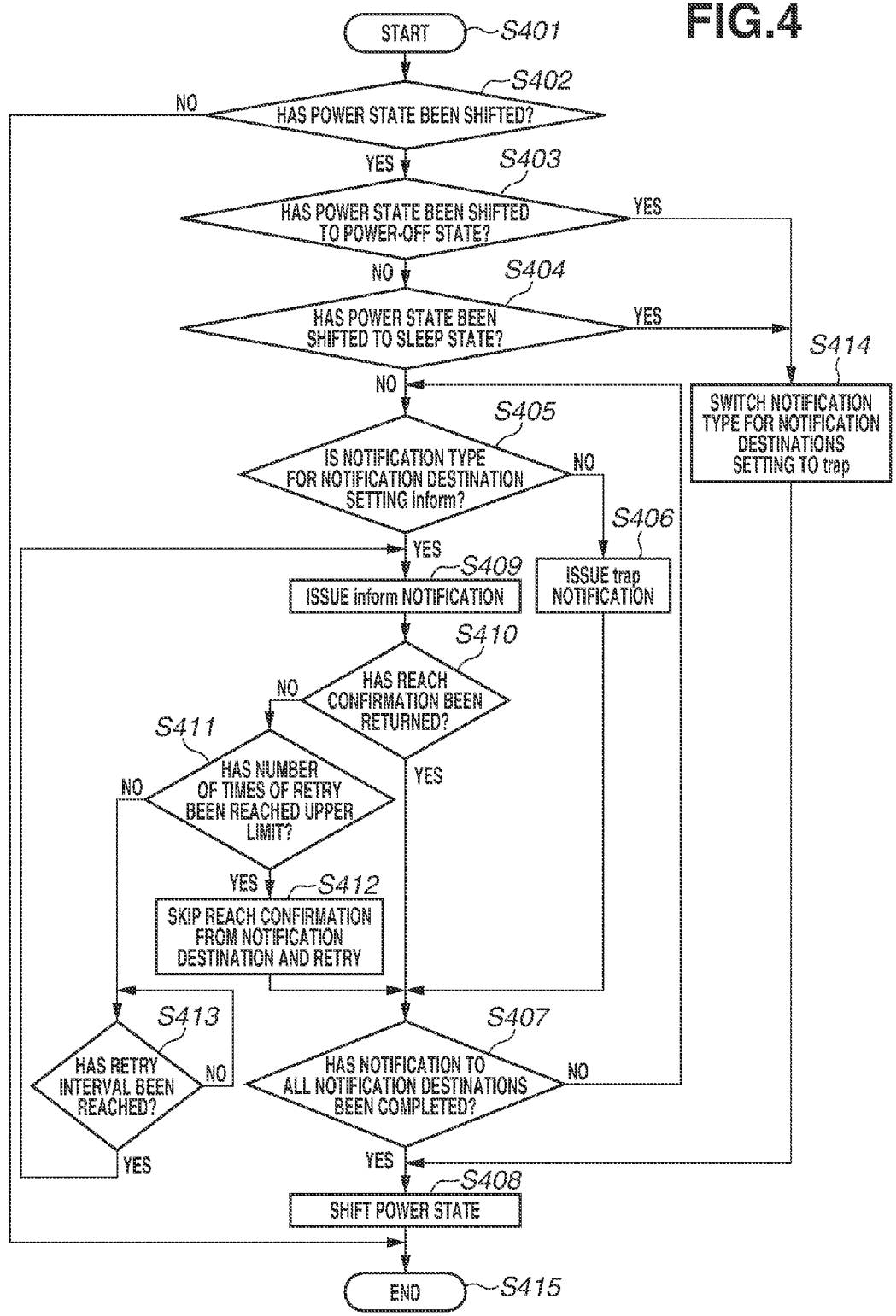

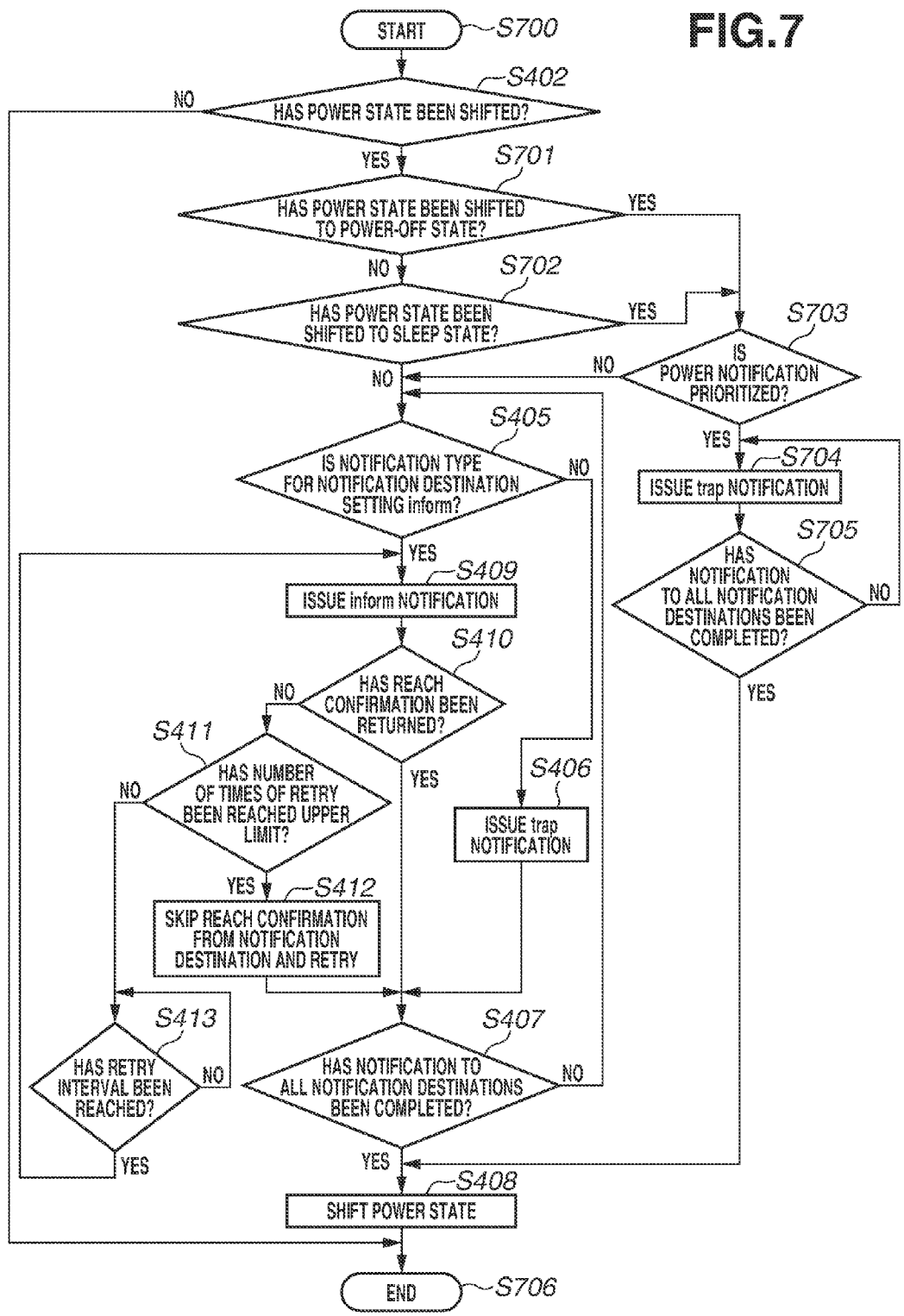

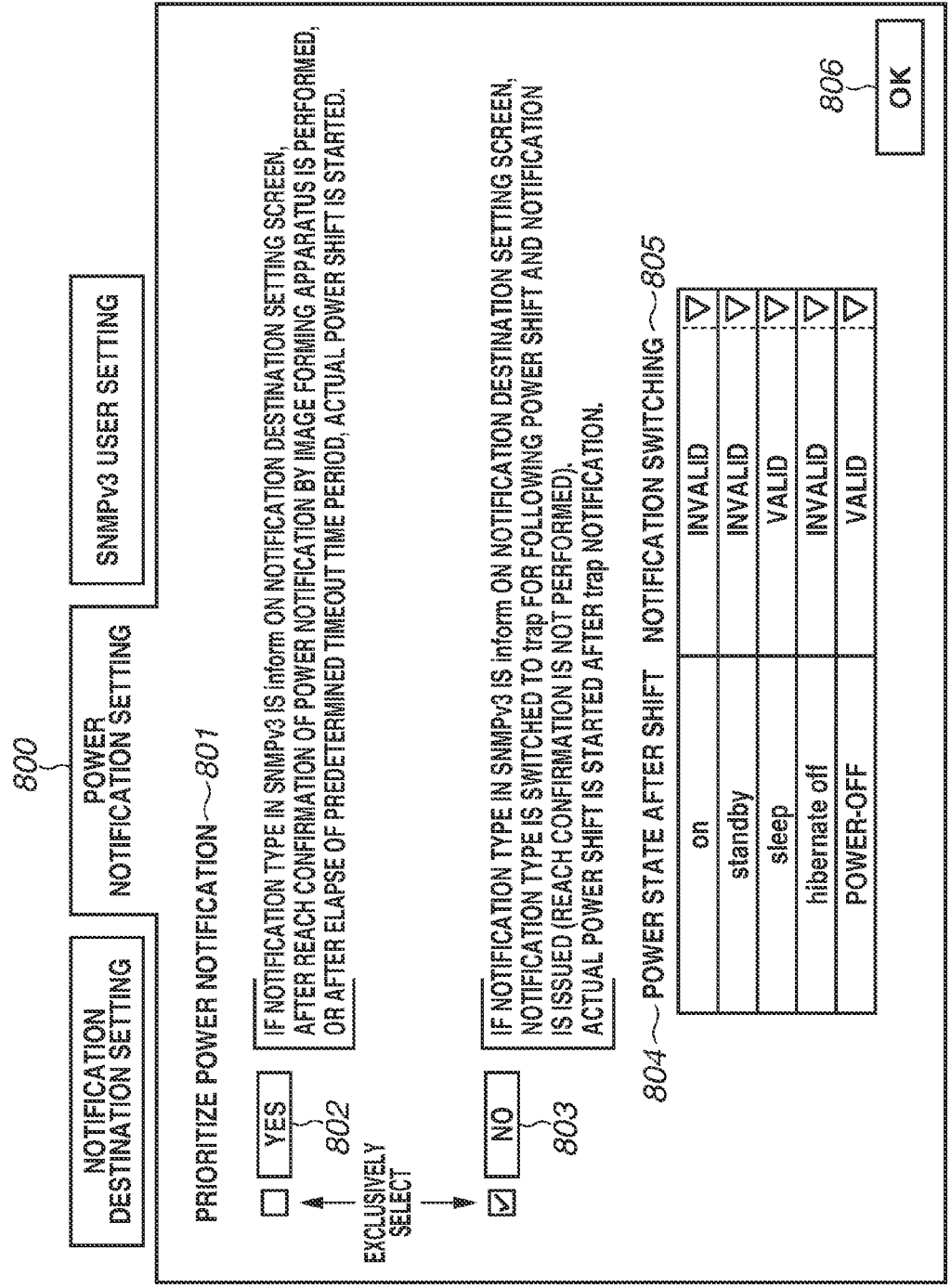

IMAGE FORMING APPARATUS, METHOD FOR CONTROLLING IMAGE FORMING APPARATUS, AND RECORDING MEDIUM

BACKGROUND

Field

Aspects of the present invention generally relate to power management of an image forming apparatus connected to a network.

Description of the Related Art

In Japanese Patent Application Laid-Open No. 2002-297336, as a method for monitoring a state of an image forming apparatus connected to a network, a monitoring terminal acquires state information from the image forming apparatus through periodic polling monitoring.

In Japanese Patent Application Laid-Open No. 2013-9139, as another monitoring method, a monitoring terminal is set so as to issue a Simple Network Management Protocol (SNMP) trap notification tow a monitoring device when a state of a network apparatus has changed, whereby the state of the network apparatus is monitored by the trap notification from the image forming apparatus.

As a method for monitoring a power state of an image forming apparatus, a method for performing device monitoring using an SNMP and a Management Information Base (MIB) is proposed. Particularly, a method for managing the power state of the image forming apparatus from a monitoring terminal using a standard of Printer Working Group (PWG) Imaging System Power MIB v1.0 (hereinafter referred to as Power MIB) (PWG Candidate Standard 5106.5-2011-PWG Imaging System Power MIB v1.0 http://ftp.pwg.org/pub/pwg/candidates/cs-wimspowermib10-20110214-5106.5.pdf) is proposed.

The standard of Power MIB includes, in addition to a method for monitoring by periodic polling from a monitoring terminal, a specification with which a state notification is issued from the side of an image forming apparatus to the side of a monitoring terminal when a power state of the image forming apparatus is shifted.

As a method for actively issuing a state notification using an SNMP/MIB from the side of an image forming apparatus to the side of a monitoring terminal, methods such as SNMPv1-Trap (RFC1157 https://www.ietf.org/rfc/rfc1157.txt), SNMPv2-Trap, and InformRequest are standardized in Request for Comments (RFC).

An SNMP is a User Datagram Protocol (UDP), i.e., a connectionless-type protocol, and does not perform a reach confirmation. Thus, a host application is required, for example, to perform retransmission in a situation of a packet loss and to assure a change of a reach order.

On the other hand, In InformRequest (hereinafter referred to as "inform"), a reach confirmation of a packet is performed. Therefore, as an issue of "inform", in a case where the power source of an image forming apparatus enters a sleep state, the image forming apparatus returns from the sleep state to a normal state when return of the reach confirmation from a monitoring terminal reaches the image forming apparatus. As another issue, in a case where the power source of the image forming apparatus is turned off, and when the power source of the image forming apparatus is turned off, communication cannot be performed. Therefore, the return of the reach confirmation from the monitoring terminal cannot be confirmed (the reach confirmation cannot be retransmitted even if the return of the reach confirmation has not reached the image forming apparatus).

More specifically, in a case where the state notification of the image forming apparatus has been issued using the notification method in which a reach confirmation is performed, a state of the image forming apparatus is affected due to the return of the reach confirmation from the monitoring terminal and the return of the reach confirmation from the monitoring terminal cannot be confirmed on the side of the image forming apparatus, depending on a state of the image forming apparatus that has been shifted after the state notification.

SUMMARY OF THE INVENTION

Aspects of the present invention are directed to providing a mechanism that notifies a monitoring terminal of a shift of a power state of an image forming apparatus without affecting shifting of the power state.

According to an aspect of the present invention, an image forming apparatus that shifts to a plurality of power states includes a notification unit configured to notify, in a case where a power state of the image forming apparatus is shifted, a predetermined notification destination of the power state, a first setting unit configured to set, as a notification method by the notification unit, a first notification method in which a reach confirmation is performed or a second notification method in which a reach notification is not performed, and a control unit configured to perform, in a case where the power state of the image forming apparatus is shifted to a specific power state, control of a notification by the notification unit in such a manner that a notification by the first notification method set by the first setting unit is switched to a notification by the second notification method.

According to aspects of the present invention, an image forming apparatus can notify a monitoring terminal of a shift of a power state of the image forming apparatus without affecting shifting of the power state.

Further features of the present disclosure will become apparent from the following description of exemplary embodiments with reference to the attached drawings.

BRIEF DESCRIPTION OF THE DRAWINGS

FIG. 1 is a diagram illustrating a configuration of an image forming apparatus according to exemplary embodiments.

FIG. 3 is a diagram illustrating a relationship between a shift and a notification of a power state of the image forming apparatus.

FIG. 4 is a flowchart illustrating processing of an image forming apparatus according to a first exemplary embodiment.

FIG. 7 is a flowchart illustrating processing of an image forming apparatus according to a second exemplary embodiment.

FIG. 8 is a diagram illustrating a power notification setting screen and setting items.

DESCRIPTION OF THE EMBODIMENTS

Figure 2A:
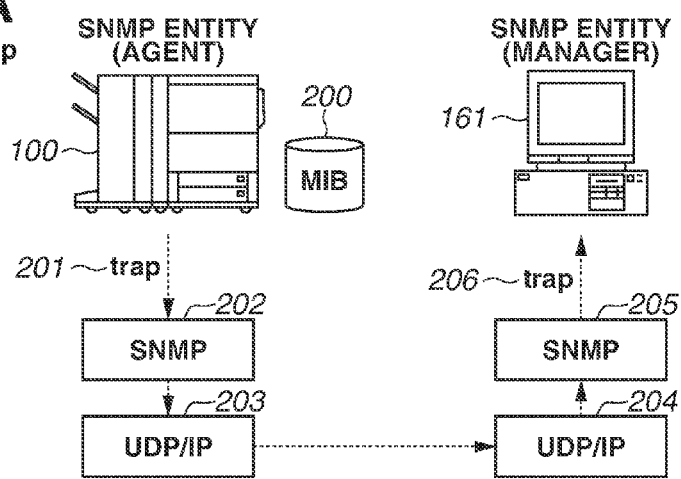
FIGS. 2A and 2B are diagrams respectively illustrating notification methods using "trap" and "inform".

Exemplary embodiments for implementing aspects of the present invention will be described below with reference to the drawings.

<Configuration of Image Forming Apparatus>

In the present exemplary embodiment, an apparatus to be monitored is an image forming apparatus, and a multifunction peripheral (MFP) having a plurality of functions, such as a copy function and a printer function, will be described as an example of the image forming apparatus. The image forming apparatus may be a single function peripheral (SFP) having only a copy function or a printer function.

FIG. 1 illustrates a configuration of an image forming apparatus 100 according to a first exemplary embodiment.

A control unit (controller unit) 110 includes a central processing unit (CPU), a read-only memory (ROM), and a random access memory (RAM), which are not illustrated, and implements various types of control in such a manner that the CPU reads out and executes a program recorded on the ROM or a hard disk drive (HDD) 150, described below. The control unit 110 is electrically connected to a reader unit 120 and a printer unit 130. The control unit 110 receives data from the reader unit 120 and the printer unit 130. The control unit 110 also transmits various types of commands to the reader unit 120 and the printer unit 130.

Further, the control unit 110 is connected to monitoring terminals 161 and 162 via a network 160, and receives image data and a control command from the monitoring terminals 161 and 162. The network 160 is constructed by Ethernet (registered trademark), for example. The monitoring terminals 161 and 162 also monitor apparatus configuration information and current status information for the image forming apparatus 100.

The reader unit 120 optically reads a document image, and converts the read document image into image data. The reader unit 120 includes a scanner unit 121 having a function of reading a document and a document feeding unit 122 that conveys the document to a position where the scanner unit 121 can read the document. A scanner controller 123 included in the scanner unit 121 controls the scanner unit 121 and the document feeding unit 122 based on an instruction from the control unit 110.

The printer unit 130 includes a sheet feeding unit 131 that houses sheets for image formation (printing) (sheets or recording materials), a marking unit 132 that transfers and fixes image data onto the sheets, and a sheet discharge unit 134 that discharges the sheets having the image data printed thereon. A printer controller 135 included in the marking unit 132 controls the marking unit 132, the sheet feeding unit 131, and the sheet discharge unit 134 based on an instruction from the control unit 110.

The printer unit 130 feeds the sheets to the marking unit 132 from the sheet feeding unit 131 based on an instruction from the control unit 110, and after the marking unit 132 prints the image data on the sheets, the printer unit 130 discharges the sheets to the sheets discharge unit 134. The sheet discharge unit 134 can perform processing, such as sorting and stapling, to the sheets on which the image data has been printed by the marking unit 132.

The sheet feeding unit 131 includes a plurality of sheet feeding sections, and the sheets are housed in each of the sheet feeding sections and are loaded (set) thereon. Each of the sheet feeding sections can house a plurality of types of sheets, such as plain paper and glossy paper. Further, each of the sheet feeding sections can house again the sheets on which the image data has been printed by the printer unit 130 in the image forming apparatus 100. Examples of the sheet feeding section include a sheet feeding cassette, a sheet feeding deck, and a manual feeding tray. The sheet feeding section is not limited to the above-described form. Alternatively, the sheet feeding unit may have any form as long as the housed sheets can be conveyed to the marking unit 132.

An operation unit 140 includes hardware keys, and a liquid crystal display unit and a touch panel unit arranged to its surface, via which the operation unit 140 receives an instruction from a user. The operation unit 140 can display software keys and a function and a state of the image forming apparatus 100 on the liquid crystal display unit. The operation unit 140 transmits a command corresponding to the instruction from the user to the control unit 110. The HDD 150 stores various types of settings of the image forming apparatus 100 and image data.

The image forming apparatus 100 implements various functions, such as a copy function, an image data transmission function, and a printer function. When the copy function is implemented, the control unit 110 performs control to cause the reader unit 120 to read image data of a document and to cause the printer unit 130 to print the image data on a sheet. When the image data transmission function is implemented, the control unit 110 converts the image data of the document read by the reader unit 120 into code data and transmits the code data to the monitoring terminals 161 and 162 via the network 160. Further, when the printer function is implemented, the control unit 110 converts the code data (print data) received from the monitoring terminals 161 and 162 via the network 160 into image data and transmits the image data to the printer unit 130. The printer unit 130 prints the received image data on a sheet.

<Description of Standard Technology>

Acquisition of information from a network apparatus, based on Request for Comments (RFC) and the Printer Working Group (PWG), which are issued for standardizing technology used in the Internet by Internet Engineering Task Force (IETF), will be described below.

A Simple Network Management Protocol (SNMP) has been generally widely used as an information monitoring protocol of a device on a network. A Management Information Base (MIB) is installed on a network apparatus managed using an SNMP, and is managed in such a manner that responding is performed to an SNMP request from a monitoring terminal.

Examples of a structure of the MIB include a specification standardized by IEFT, a specification industry-standardized by the PWG, and a private MIB specification uniquely expanded by a vendor. The MIB information has a hierarchical structure by category, numbers are respectively assigned to branches, and a string of the numbers is called Object Identifier (OID). The hierarchical structure of an OID, what types of pieces of information is included in an object having the OID, and what data type is used to define the object is specified by various types of RFC or uniquely defined by a company.

The definition of a data type is defined in RFC as Structure of Management Information (SMI), and is expressed in a description language, which is defined by International Organization for Standardization (ISO) and International Telecommunication Union Telecommunication Standardization Sector (ITU-T), such as Abstract Syntax Notation One (ASN.1). The technical specifications do not remain unchanged, and are updated by the progress in technology.

For example, there is a number "RFCxxxx" in RFC. In updating a specification published once, an old number is considered obsolete, and a new number is assigned.

To monitor a power state of a network apparatus using an SNMP and an MIB from a remote monitoring terminal on a network, the PWG Imaging System Power MIBv1.0 (hereinafter referred to as Power MIB) is proposed as an industry standard from the PWG.

The Power MIB specification also includes a specification for, in addition to the case where power state management is performed by periodic polling from the monitoring terminal to the network apparatus to be managed, the case where a network apparatus to be managed issues a state notification to a monitoring terminal in response to a shift of its own power state.

In the present exemplary embodiment, a method for performing device monitoring using an SNMP and an MIB will be described as an example. Particularly, control to manage a power state of the image forming apparatus 100 from the monitoring terminal using a Power MIB standard will be described.

There are mainly two methods for issuing a notification using an SNMP from a network apparatus to a monitoring terminal.

The difference between the two notification methods will be then simply described with reference to FIG. 2.

<Trap and Inform>

Figure 2B:
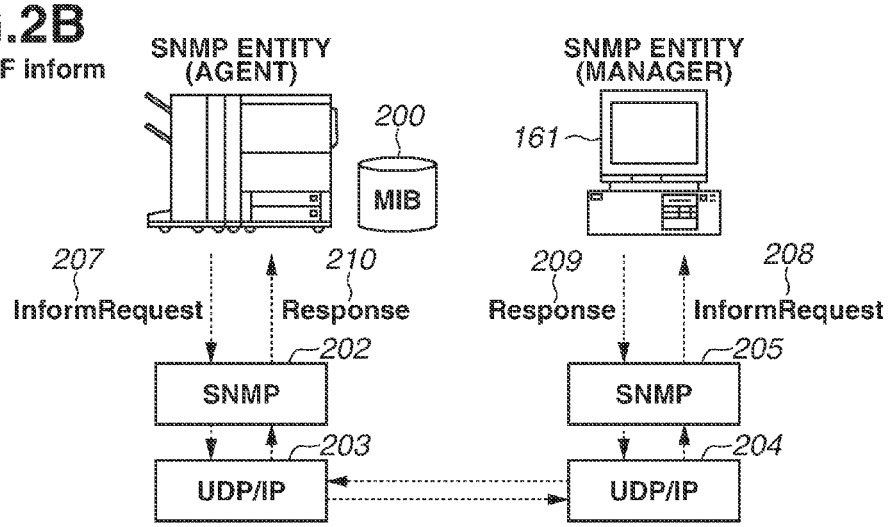

FIGS. 2A and 2B are diagrams respectively illustrating notification methods using "trap" and "inform".

The following describes the point which is common between "trap" and "inform".

An SNMP management function is implemented by components each called an SNMP entity. For convenience, the component of which information is managed using an SNMP is referred to as an "agent", and the component which manages the information is referred to as a "manager".

The image forming apparatus 100 is an apparatus of which information is managed, on the side of the agent. The image forming apparatus 100 has MIB information 200 as information to be managed. The monitoring terminal 161 serving as an apparatus on the side of the manager is previously registered as an information notification destination in the image forming apparatus 100. The image forming apparatus 100 is set to issue a notification when the MIB information 200 has changed. In the MIB information 200, various types of information are managed. Whether a notification is issued depending on which of the information has changed is previously set. In an example of the Power MIB, a specification in which a notification is issued from the agent side to the manager side when a power shift occurs and the MIB information 200 is changed.

In a case where the notification is issued using "trap", the image forming apparatus 100 sets a notification type to trap 201 at the time point where the MIB information 200 has changed, and calls an SNMP module 202 together with the MIB information 200 to be notified. The SNMP module 202 calls a communication module UDP/IP 203, and transmits a notification together with the MIB information 200 to a communication module UDP/IP 204 of the monitoring terminal 161 on the side of the manager.

The communication module UDP/IP 204 notifies an SNMP module 205 that the notification of which type is the trap 201 is received together with the MIB information 200 from the image forming apparatus 100 on the side of the agent. The SNMP module 205 notifies a device monitoring application operating in the monitoring terminal 161 of reach of the notification using the trap 206 from the image forming apparatus 100 together with the MIB information 200.

In a case where the notification is issued using "inform", the image forming apparatus 100 sets a notification type to InformRequest 207 at the time point where the MIB information 200 has changed, and calls the SNMP module 202 together with the MIB information 200 to be notified. The SNMP module 202 calls the communication module UDP/IP 203, and transmits a notification together with the MIB information 200 to the communication module UDP/IP 204 of the monitoring terminal 161 on the side of the manager.

The communication module UDP/IP 204 notifies the SNMP module 205 that the notification of which type is the InformRequest 207 is received together with the MIB information 200 from the image forming apparatus 100 on the side of the agent. The SNMP module 205 notifies the device monitoring application operating in the monitoring terminal 161 that the notification using InformRequest 208 is received together with the MIB information 200 from the image forming apparatus 100. The device monitoring application operating in the monitoring terminal 161, which has received the information notification from the image forming apparatus 100, sets Response 209 to the InformRequest 208 in the SNMP module 205 as a confirmation response indicating that the information notification has been reliably received. The SNMP module 205 further calls the communication module UDP/IP 204 to perform a confirmation response to the image forming apparatus 100, and transmits the confirmation response to the communication module UDP/IP 203 of the image forming apparatus 100 on the side of the agent. The SNMP module 202 notifies the image forming apparatus 100 of Response 210 as a confirmation response to the InformRequest 207.

In a case where a predetermined period of time has elapsed until receiving the Response 210 after starting to notify the monitoring terminal 161 of the InformRequest 207, the image forming apparatus 100 determines that the InformRequest 207 has not reached the monitoring terminal 161. In a case where the image forming apparatus 100 determines that the InformRequest 207 has not reached the monitoring terminal 161, the image forming apparatus 100 retransmits the InformRequest 207 at a predetermined interval and for the predetermined number of times.

A difference in specifications between "trap" and "inform" is simply summarized as follows.

The "trap" only unilaterally notifies a notification destination of a state change. Since the "trap" only unilaterally notifies the notification destination of the state change, an address, which can be set as the notification destination, may be any one of unicast, multicast, and broadcast addresses.

The "inform" performs a reach confirmation. Thus, in a case where there is no Response from the SNMP manager, the SNMP agent retransmits the InformRequest 207 at a predetermined interval and for the predetermined number of times. Since the "inform" has a system requiring a reach confirmation, multicast and broadcast addresses, which are for a large unspecified number of notification destinations, are not set as the notification destination but a multicast address is always designated as the notification destination.

Figure 9A:
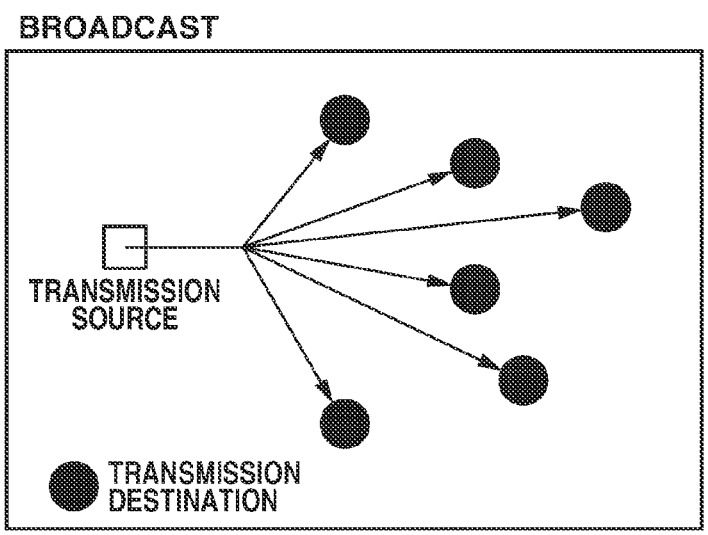
FIGS. 9A, 9B, and 9C are conceptual diagrams of unicast, multicast, and broadcast, respectively.
Figure 9B:
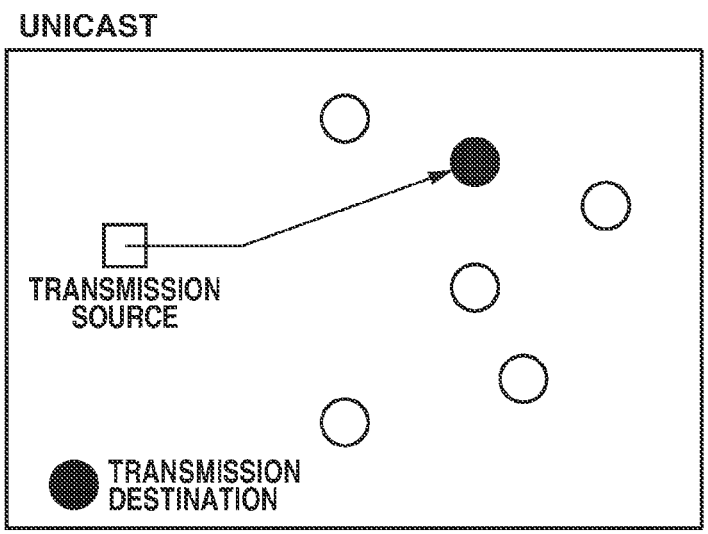
Figure 9C:
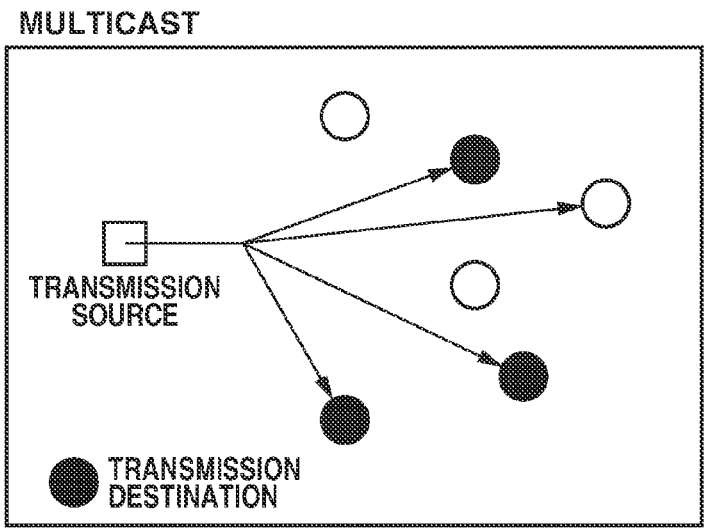

FIGS. 9A, 9B, and 9C are diagrams respectively illustrating concepts of unicast, multicast, and broadcast.

<Typical Example of Power Shift of Image Forming Apparatus>

FIG. 3 is a diagram illustrating a relationship between a typical power shift of the image forming apparatus 100 and a power shift notification to the monitoring terminal 161.

In FIG. 3, a vertical axis 320 indicates power consumption (consumed power) of the image forming apparatus 100, and a horizontal axis 319 indicates an elapsed time.

The image forming apparatus 100 shifts to a plurality of power states. A power state 300 indicates maximum power consumed by the image forming apparatus 100. A power state 303 indicates power consumed when the image forming apparatus 100 is in a sleep state (a power saving state). Power states 301 and 302 indicate other power consumption states of the image forming apparatus 100. For example, the power state 301 indicates power consumed when the control unit 110, the reader unit 120, and the printer unit 130 are simultaneously in operation, and the power state 302 indicates power consumed when the control unit 110 and the printer unit 130 are in operation.

A power shift and a power state notification from power-on 304 to power-off 316 of the image forming apparatus 100 will be described below in time series.

First, the power of the image forming apparatus 100 is turned on at the power-on 304. Immediately after the power is turned on, various types of initialization processing of the image forming apparatus 100 and a temperature adjustment operation of the marking unit 132 are performed. Thus, the image forming apparatus 100 enters the power state 300 in which the maximum power is consumed.

The image forming apparatus 100 issues a power state notification 305 using "inform" to the monitoring terminal 161 by being triggered by the occurrence of a change in the power consumption when the power is turned on. The monitoring terminal 161, which has received the power state notification 305, returns the receiving of the power state notification 305 from the image forming apparatus 100 as a reach confirmation response 306.

Then, in a case where the image forming apparatus 100 does not operate for a predetermined period of time and in a case where the control unit 110 has received an instruction from the user, the power state of the image forming apparatus 100 is shifted to a sleep state at sleep 307. In such a case, power shifting occurs. Thus, a power state notification 308 is issued to the monitoring terminal 161 from the image forming apparatus 100. The monitoring terminal 161, which has received the power state notification 308, returns the receiving of the power state notification 308 from the image forming apparatus 100 as a reach confirmation response 309. Although an example in which there is no change in the power state of the image forming apparatus 100, which has received the reach confirmation response 309, has been described in FIG. 3, the image forming apparatus 100 may respond to the reach confirmation response 309 so that the sleep state is canceled and the power consumption is increased.

In a case where the image forming apparatus 100 in the sleep state is requested to execute a job, the control unit 110 cancels the sleep state, and energizes a component(s) required for processing in the image forming apparatus 100. In this case, the component(s) required for the processing is energized, and the power consumption of the image forming apparatus 100 changes. Thus, a power state notification 310 is issued to the monitoring terminal 161 from the image forming apparatus 100. The monitoring terminal 161, which has received the power state notification 310, returns the receiving of the power state notification 310 from the image forming apparatus 100 as a reach confirmation response 311.

Similarly, a power state notification 312 and a reach confirmation response 313 and a power state notification 314 and a reach confirmation response 315 are exchanged between the image forming apparatus 100 and the monitoring terminal 161 as the power state of the image forming apparatus 100 changes.

At the power-off 316, the control unit 110, which has received a power-off instruction from the user starts processing for shutting down the image forming apparatus 100. Since a power shift occurs as the image forming apparatus 100 shuts down, a power state notification 317 is issued to the monitoring terminal 161 from the image forming apparatus 100. The monitoring terminal 161, which has received the power state notification 317, returns the receiving of the power state notification 317 from the image forming apparatus 100 as a reach confirmation response 318. The reach confirmation response 318 cannot be received after the image forming apparatus 100 has shut down. Thus, the image forming apparatus 100 cannot confirm whether the power state notification 317 has reached the monitoring terminal 161.

The present exemplary embodiment will be described below with reference to a flowchart of FIG. 4.

FIG. 4 is a flowchart illustrating processing of the image forming apparatus 100 according to a first exemplary embodiment. The processing in the flowchart is implemented in such a manner that the control unit 110 of the image forming apparatus 100 reads out and executes a program recorded on the ROM or the HDD 150.

In step S401, the control unit 110 of the image forming apparatus 100 starts processing. In step S402, the control unit 110 determines whether the power state of the image forming apparatus 100 has been shifted. In a case where the control unit 110 determines that the power state has not been shifted (NO in step S402), the processing proceeds to step S415. In step S415, the processing in the flowchart ends. On the other hand, in a case where the control unit 110 determines that the power state has been shifted (YES in step S402), the processing proceeds to step S403.

In step S403, the control unit 110 determines whether the power state of the image forming apparatus 100 has been shifted to a power-off state. In a case where the control unit 110 determines that the power state has not been shifted to the power-off state (NO in step S403), the processing proceeds to step S404. On the other hand, in a case where the control unit 110 determines that the power state has been shifted to the power-off state (YES in step S403), the processing proceeds to step S414.

In step S404, the control unit 110 determines whether the power state of the image forming apparatus 100 has been shifted to a sleep state (a power saving state). In a case where the control unit 110 determines that the power state has not been shifted to the sleep state (NO in step S404), the processing proceeds to step S405. On the other hand, in a case where the control unit 110 determines that the power state has been shifted to the sleep state (YES in step S404), the processing proceeds to step S414.

In step S414, the control unit 110 temporarily switches a notification type indicated in a setting item 608, described below, to "trap" for a notification destination setting in which the notification type is "inform", and issues a power state shift notification to all transmission destinations set in FIG. 6, and the processing then proceeds to step S408.

In step S405, the control unit 110 determines whether the notification type indicated in the setting item 608 for the notification destination setting is "inform". In a case where the control unit 110 determines that the notification type indicated in the setting item 608 for the notification destination setting is "inform" (YES in step S405), the processing proceeds to step S409.

On the other hand, in a case where the control unit 110 determines that the notification type indicated in the setting item 608 for the notification destination setting is not "inform" (i.e., "trap") (NO in step S405), the processing proceeds to step S406. In an SNMPv1 notification setting, it is clear that an inform setting does not exist as an SNMP specification, i.e., only a trap setting exists. Thus, the processing always proceeds to step S406 for an SNMPv1 notification destination.

In step S406, the control unit 110 issues a trap notification along a setting content of the notification destination set in FIG. 6, described below, and the processing proceeds to step S407.

Figure 6:
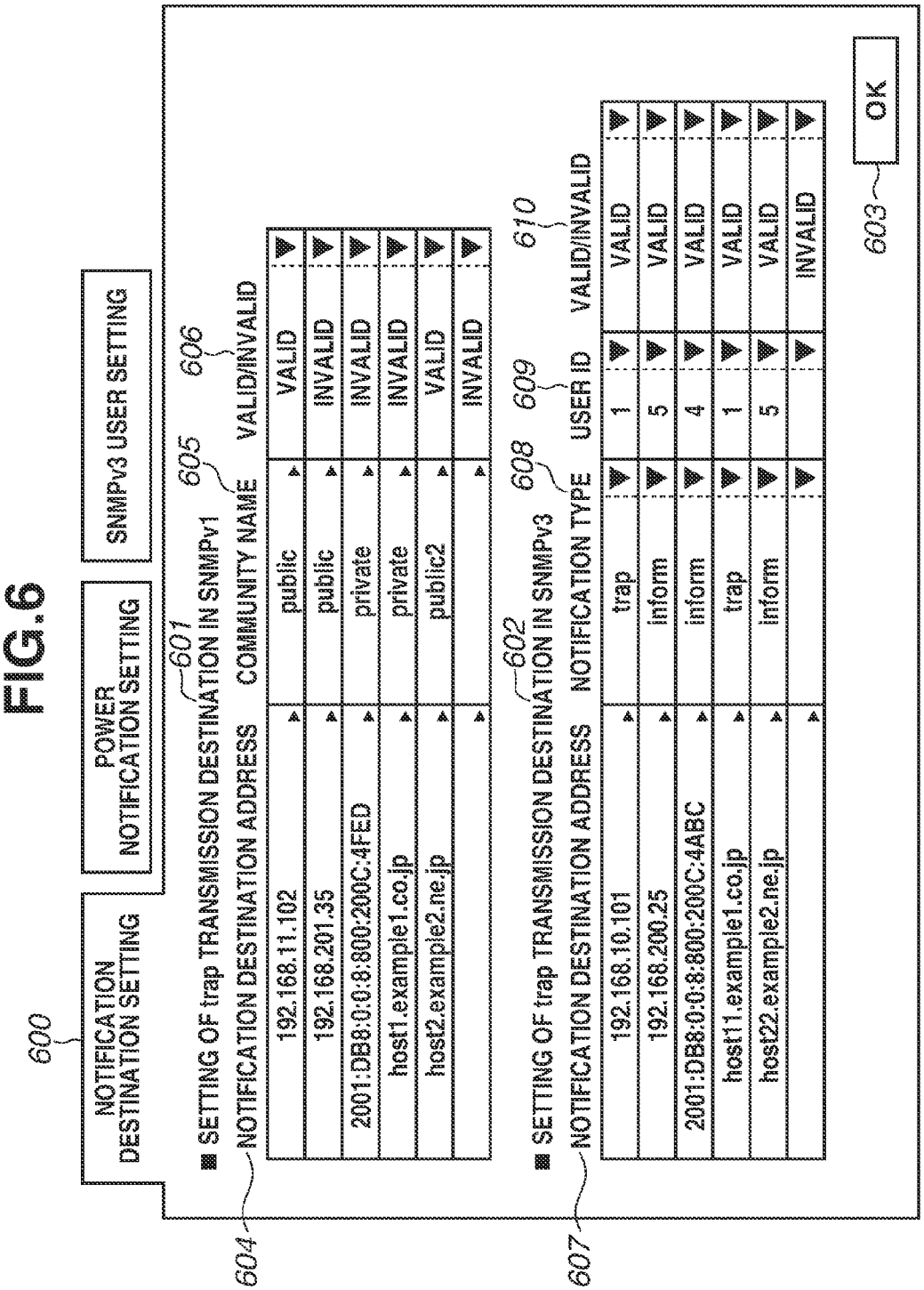
FIG. 6 is a diagram illustrating a setting screen and setting items of respective trap transmission destinations in SNMPv1 and SNMPv3.

In step S407, the control unit 110 determines whether the notification has been issued to all the notification destinations set in FIG. 6. in a case where the control unit 110 determines that the notification destination to which the notification is to be issued remains (NO in step S407), the processing returns to step S405. Then, the control unit 110 performs control to issue the notification to the subsequent notification destination. On the other hand, in a case where the control unit 110 determines that the notification destination to which the notification is to be issued does not remain (YES in step S407), the processing proceeds to step S408.

In step S408, the control unit 110 shifts the power state of the image forming apparatus 100. In step S415, a series of processes ends.

In step S409, the control unit 110 issues a power shift notification using "inform" described in FIG. 2.

In step S410, the control unit 110 then determines whether a reach confirmation response has been returned within a predetermined period of time (e.g., five seconds) from the notification destination to which the power shift notification has been issued. In a case where the control unit 110 determines that the reach confirmation response has been returned (YES in step S410), the processing proceeds to step S407. On the other hand, in a case where the control unit 110 determines that the reach confirmation response has not been returned (NO in step S410), the processing proceeds to step S411.

In step S411, the control unit 110 determines whether the predetermined number of times of (e.g., five times of) retry of the inform notification has reached its upper limit. In a case where the control unit 110 determines that the number of times of retry has not reached the upper limit (NO in step S411), the processing proceeds to step S413.

In step S413, the control unit 110 determines whether a predetermined retry interval (e.g., 30 seconds) has elapsed. The process of Step S413 is looped until the retry interval is reached. In a case where the control unit 110 determines that the retry interval has been reached (YES in step S413), the processing returns to step S409.

In a case where the control unit 110 determines that the number of times of retry has reached the upper limit (YES in step S411), the processing proceeds to step S412.

In step S412, since the control unit 110 cannot obtain the reach confirmation response from an inform notification destination even if the number of times of retry of the inform notification reaches the upper limit, the control unit 110 skips the reach confirmation from the notification destination and the retry, and the processing proceeds to step S407. Step S407 and the subsequent steps have already been described, and hence description thereof is not repeated.

An SNMPv3 user setting screen and setting items will be described below.

Figure 5:
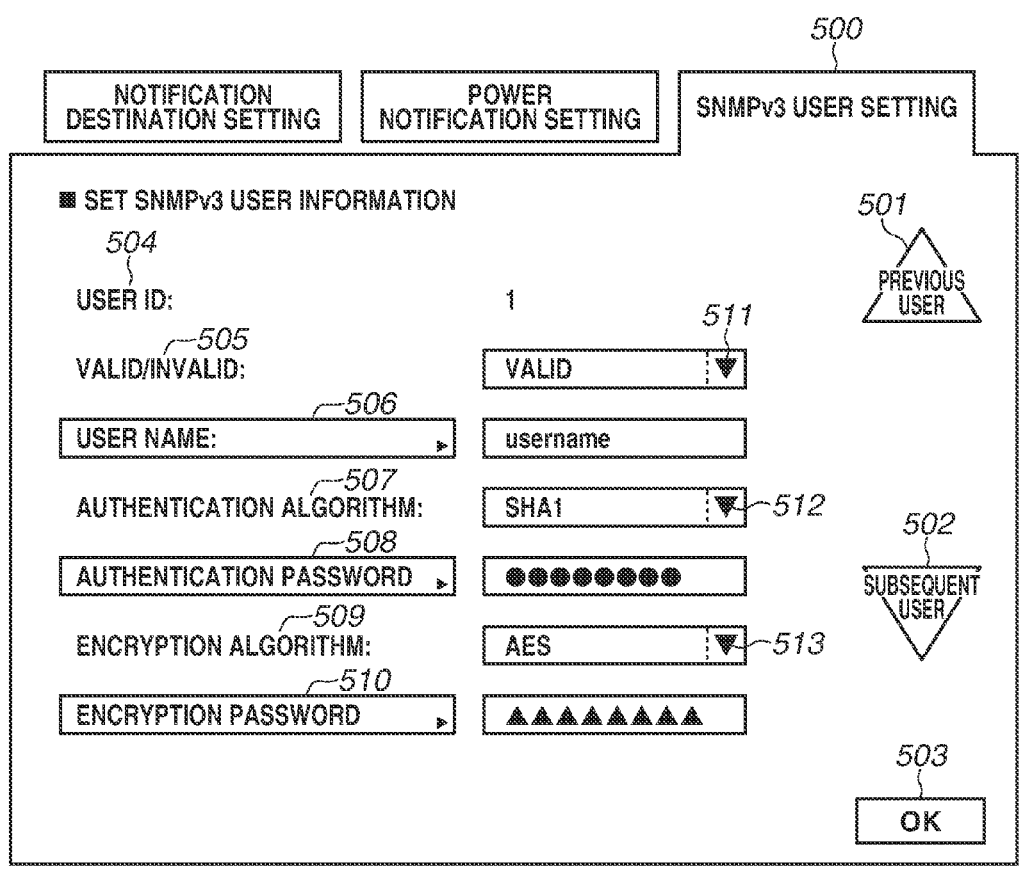
FIG. 5 is a diagram illustrating an SNMPv3 user setting screen and setting items.

FIG. 5 is a diagram illustrating the SNMPv3 user setting screen and the setting items.

SNMPv3 is standardized by Internet Engineering Task Force (IETF) Suspend To Disk (STD) 62 (IETF STD62 http://www.rfc-editor.org/std/std62.txt), and performs communication using a user-based authentication mechanism and encryption.

A setting example 500 of an operation unit screen for an SNMPv3 user setting is displayed on a touch panel unit of the operation unit 140.

A plurality of SNMPv3 users can be registered. Buttons 501 and 502 are used to switch the operation unit screen currently set to operation unit screens for previous and subsequent user settings.

A setting item 504 indicates a user identifier (ID) for uniquely specifying the SNMPv3 user in the control unit 110. Since the user ID is managed by the control unit 110, the setting item 504 merely displays the user ID but is not operable by the user.

A setting item 505 is used for validating/invalidating a setting of the SNMPv3 user specified by the user ID indicated in the setting item 504, and can be changed by selecting validation/invalidation from a pull-down setting 511.

A setting item 506 is used for setting a user name corresponding to the user ID. When the user presses the setting item 506, the screen changes to a screen, such as a software keyboard input unit (not illustrated). Thus, the user can input and change the user name.

A setting item 507 is used for setting authentication algorithm for performing authentication by SNMPv3 communication for the user name set in the setting item 506. The user can select any one of "NO", "MD5", and "SHA1" from a pull-down setting by pressing a pull-down setting 512.

A setting item 508 is used for inputting an authentication password in the authentication algorithm selected in the setting item 507. When the user presses the setting item 508, the screen changes to a screen, such as a software keyboard input unit (not illustrated). Thus, the user can input and change the authentication password.

A setting item 509 is used for setting encryption algorithm when the SNMPv3 user specified by the user ID indicated in the setting item 504 performs SNMPv3 communication. The user can select any one of "NO", "DES", and "AES" by pressing a pull-down setting 513.

A setting item 510 is used for inputting an encryption password in the encryption algorithm selected in the setting item 509. When the user presses the setting item 510, the screen changes to a screen, such as a software keyboard input unit (not illustrated). Thus, the user can input and change the encryption password.

A minimum and maximum character string length may be provided for each of the user name indicated in the setting item 506, the authentication password indicated in the setting item 508, and the encryption password indicated in the setting item 510.

When the SNMPv3 user setting is completed, and the user presses an OK button 503, an SNMPv3 user setting value is transmitted to the control unit 110 from the operation unit 140. The control unit 110 performs the SNMPv3 communication based on the received SNMPv3 user setting value.

A setting screen and setting items of trap transmission destinations in each of SNMPv1 and SNMPv3 will be described below.

FIG. 6 is a diagram illustrating a setting screen and setting items of trap transmission destinations in each of SNMPv1 and SNMPv3.

A setting example 600 of an operation unit screen for performing notification destination settings in SNMPv1 and SNMPv3 is displayed on a touch panel section of the operation unit 140.

A display example 601 is used for performing the notification destination setting in SNMPv1.

In a notification destination address setting item 604, an IPv4 address, an IPv6 address, a Fully Qualified Domain Name (FQDN) can be set as a notification destination in a screen example.

In a community name setting item 605, management targets are grouped using a community name in SNMPv1 communication, and the SNMPv1 communication is performed among nodes belonging to the same community. A management scope can be changed for each community name, and read-only and read-write access modes can also be switched.

A setting item 606 is used for switching validation and invalidation of the notification destination.

A display example 602 is for performing the notification destination setting in SNMPv3.

In a notification destination address setting item 607, an IPv4 address, an IPv6 address, a Fully Qualified Domain Name (FQDN) can be set as notification destinations in a screen example, like in the notification destination address setting item 604.

A setting item 608 is used for selecting a notification type in SNMPv3. Either one of a trap notification and an inform notification can be selected in SNMPv3.

A setting item 609 is used for setting an SNMPv3 user ID to be used when the notification is issued. The detailed setting of the user ID is set in the above-described operation unit screen illustrated in FIG. 5, and is associated with the user ID in the setting item 504.

A setting item 610 is used for switching validation and invalidation of the notification destination.

When the notification destination settings in each of the SNMPv1 and the SNMPv3 are completed, and the user presses an OK button 603, an SNMP notification destination setting value is transmitted to the control unit 110 from the operation unit 140. The control unit 110 performs an SNMP notification based on the received SNMP notification destination setting value.

As described above, according to the first exemplary embodiment, in a case where the image forming apparatus 100 shifts to a specific power state, the notification method (notification type) for the power notification to the monitoring terminal is switched. Therefore, the power notification to the monitoring terminal can be issued without preventing the power state of the image forming apparatus 100 from shifting. Further, the notification method is switched from "Inform" to "trap" to perform the power notification. Since the reach confirmation is not performed, the power state can be immediately shifted after the power notification.

In the above described first exemplary embodiment, the inform notification destination setting is temporarily switched to the trap notification destination setting for power shifts at a power-off time and a sleep time of the image forming apparatus 100, and a reach confirmation is not performed. In a second exemplary embodiment, it is set whether to notify a monitoring terminal that a power state has been shifted is prioritized. Based on the setting, it becomes possible to switch between settings in which a notification including a reach confirmation is prioritized and a power shift is prioritized.

Difference between the second exemplary embodiment and the first exemplary embodiment will be described below,
and description of the same components as those in the first exemplary embodiment is not repeated.

The present exemplary embodiment will be described with reference to a flowchart of FIG. 7.

FIG. 7 is a flowchart illustrating processing of an image forming apparatus 100 according to the second exemplary embodiment. The processing in the flowchart is implemented in such a manner that a control unit 110 of the image forming apparatus 100 reads out and executes a program recorded on a ROM and a HDD 150.

FIG. 7 is a flowchart prepared by adding a condition branch and processes to the flowchart illustrated in FIG. 4, and thus only difference therebetween will be described. The same steps as those illustrated in FIG. 4 are assigned the same step numbers.

In step S700, the control unit 110 of the image forming apparatus 100 starts processing. In step S402, the control unit 110 determines whether a power state of the image forming apparatus 100 has been shifted. In a case where the control unit 110 determines that the power state has not been shifted (NO in step S402), the processing proceeds to step S706. In step S706, the processing in the flowchart ends. On the other hand, in a case where the control unit 110 determines that the power state has been shifted (YES in step S402), the processing proceeds to step S701.

In step S701, the control unit 110 determines whether the power state of the image forming apparatus 100 has been changed to a power-off state. In a case where the control unit 110 determines that the power state has been shifted to the power-off state (YES in step S701), the processing proceeds to step S703. On the other hand, in a case where the control unit 110 determines that the power state has not been shifted to the power-off state (NO in step S701), the processing proceeds to step S702.

In step S702, the control unit 110 determines whether the power state of the image forming apparatus 100 has been shifted to a sleep state. In a case where the control unit 110 determines that the power state has not been shifted to the sleep state (NO in step S702), the processing proceeds to step S405. Description of processes in step S405 and the subsequent steps is not repeated.

On the other hand, in a case where the control unit 110 determines that the power state has been shifted to the sleep state (YES in step S702), the processing proceeds to step S703.

In step S703, the control unit 110 refers to a setting value in a power notification priority setting 801 illustrated in FIG. 8, described below, and determines whether the power notification priority setting 801 is set in a way in which a power notification is prioritized ("YES" 802). In a case where the control unit 110 determines that the power notification priority setting 801 is set in a way in which the power notification is not prioritized ("NO" 803) (NO in step S703), the processing proceeds to step S405.

On the other hand, in a case where the control unit 110 determines that the power notification priority setting 801 is set in a way in which the power notification is prioritized ("YES" 802) (YES in step S703), the processing proceeds to step S704.

In step S704, the control unit 110 temporarily switches a notification type set in the setting item 608 illustrated in FIG. 6 to "trap" for a notification destination setting of which notification type is set "inform", and the processing proceeds to step S705.

In step S705, the control unit 110 determines whether a power state shift notification has been issued to all the notification destinations set in FIG. 6. In a case where the control unit 110 determines that the power state shift notification has not yet been issued to all the notification destinations (NO in step S705), the processing proceeds to step S704. In step S704, the control unit 110 performs control to issue the notification to the subsequent notification destination. On the other hand, in a case where the control unit 110 determines that the power state shift notification has been issued to all the notification destinations (YES in step S705), the processing proceeds to step S408.

A power notification setting screen and setting items will be described below with reference to FIG. 8.

FIG. 8 is a diagram illustrating the power notification setting screen and the setting items.

A setting example 800 of an operation unit screen for a power notification setting is displayed on a touch panel section of an operation unit 140. A setting item (priority setting) 801 is used for setting whether a power notification is prioritized. A user exclusively selects "YES" 802 in a case where the power notification is prioritized and "NO" 803 in a case where the power notification is not prioritized, and presses an OK button 806. Then, a setting value is transmitted from the operation unit 140 to the control unit 110. The control unit 110 stores the setting value in a storage device, such as an internal flash ROM (not illustrated) or a HDD 150, for example.

A notification switching 805 for switching whether a power state shift notification is issued based on a power state 804, to which a power state of the image forming apparatus 100 after shifting is set, may be additionally provided. In a case where the notification switching 805 is provided, although such a case is not illustrated in the flowchart of FIG. 7, the control unit 110 performs control of whether the power state shift notification is issued for each power state which is a state after shifting, based on corresponding setting values indicated in the power state 804 and the notification switching 805. More specifically, if user interfaces (UIs) (804 and 805) are provided for a setting of whether switching of a notification method is set valid for each power state which is a state after shifting, and in a case where the switching of a notification method has been set valid for the power state which is a state after shifting of the image forming apparatus 100, the switching of the notification method may be performed.

As described above, according to the second exemplary embodiment, the power state of the image forming apparatus 100 can be more appropriately managed depending on an installation environment of the image forming apparatus 100 in such a manner that the user can select from the UI the priority of obtaining of the power state by the monitoring terminal at shifting of a specific power state and it can be set whether the switching of the notification method is set valid for each power state which is a state after shifting.

In a case where the notification method is switched to "trap" and the power notification is issued, and when it is certain that the power state of the image forming apparatus 100 is to be shifted (e.g., a case where the power state is shifted using a timer), an advance notification for shifting may be previously issued, in consideration of the possibility that the power notification does not reach the monitoring terminal.

The monitoring terminal periodically checks, based on a log of Power MIB and the like, whether there is any power notification using "trap" failed to be received. In a case where it is detected that there is a power notification using "trap" failed to be received, the monitoring terminal registers the power notification to the corresponding image forming apparatus so that the power notification using "inform" is to be issued. The checking of whether there is any power notification using "trap" failed to be received is performed depending on whether there is an inconsistency in the power state shift in the log of Power MIB. Examples of the inconsistency include, a case where, although there is a log indicating power-on, there is no log indicating power-off and another log indicating power-on is then recorded, and a case where, although there is a log indicating shifting to sleep, there is no log indicating returning from sleep and another log indicating shifting to sleep is then recorded.

The monitoring terminal measures a period of time required for a reach confirmation (response) in "inform" and the number of times of retransmission. In a case where the sum of periods of time required for the reach confirmation and a value, such as the number of times of retransmission, exceed predetermined threshold values within a predetermined period, the notification method may be switched to "trap" and a power notification may be issued. The control is not limited to the configuration in which the notification method is switched to "trap". Alternatively, the control may be performed in such a manner that the notification method is switched to "inform" (unicast), "trap" (unicast), "trap" (broadcast), and no power notification, in this order.

In a case where the setting of the notification method on the image forming apparatus 100 is switched from the monitoring terminal, the switching of the setting of the notification method from the operation unit 140 on the image forming apparatus 100 is controlled so as to be inhibited. For example, switching of only the setting of the notification method, which has been switched from the monitoring terminal, on the image forming apparatus 100 is controlled so as to be inhibited.

In each of the above described exemplary embodiments, an SNMP InformRequest notification and an SNMP trap notification are used as a power notification method performed when the power state of the image forming apparatus is shifted. However, the notification method is not limited to "inform" and "trap". Any notification method may be used as long as the notification method uses a method in which a reach confirmation is performed and a method in which a reach confirmation is not performed. Any notification method may be used as long as, in a case where the image forming apparatus shifts to a specific power state (e.g., a power-off state or a sleep state), a notification method in which a reach confirmation is performed is switched to a notification method in which a reach confirmation is not performed so that a power notification is issued to the monitoring terminal.

While the image forming apparatus has been used as an example of an apparatus to be monitored in each of the above described exemplary embodiments, an apparatus to be monitored is not limited to the image forming apparatus. Other types of apparatus may be used as long as it is a network apparatus having a plurality of power states. For example, the apparatus to be monitored may be a network home electrical appliance.

The above-described structures and contents of various types of data, are not limited to these, and the data are formed by various structures and contents depending on uses and purposes.

While the exemplary embodiments have been described above, aspects of the present invention can be implemented in a form of a system, an apparatus, a method, a program, or a storage medium, for example. More specifically, aspects of the present invention may be applied to a system including a plurality of apparatuses or may be applied to an apparatus including one device.

All combinations of the above described exemplary embodiments are included in the aspects of the present invention.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-001962, filed Jan. 8, 2015, which is hereby incorporated by reference herein in its entirety.

What is claimed is:

1. An image forming apparatus that transmits information to notification destinations that have been registered in the image forming apparatus in advance by using either Trap of Simple Network Management Protocol (SNMP) or InformRequest of SNMP, the image forming apparatus comprising:
   a processor; and
   a memory storing instructions that, when executed by the processor, cause the image forming apparatus to perform operations comprising:
   setting, for each of the notification destinations, whether to use Trap or InformRequest; and
   transmitting predetermined information by using Trap in a case where the image forming apparatus shifts to a sleep state,
   wherein, even in a case where use of InformRequest has been set for a specific notification destination, the predetermined information is transmitted to the specific notification destination by using Trap.

2. A method for controlling an image forming apparatus that transmits information to notification destinations that have been registered in the image forming apparatus in advance by using either Trap of Simple Network Management Protocol (SNMP) or InformRequest of SNMP, the method comprising:
   setting, for each of the notification destinations, whether to use Trap or InformRequest; and
   transmitting predetermined information by using Trap in a case where the image forming apparatus shifts to a sleep state,
   wherein, even in a case where use of InformRequest has been set for a specific notification destination, the predetermined information is transmitted to the specific notification destination by using Trap.

3. A non-transitory computer-readable recording medium storing computer executable instructions that cause a computer to implement a method for controlling an image forming apparatus that transmits information to notification destinations that have been registered in the image forming apparatus in advance by using either Trap of Simple Network Management Protocol (SNMP) or InformRequest of SNMP, the method comprising:
   setting, for each of the notification destinations, whether to use Trap or InformRequest; and
   transmitting predetermined information by using Trap in a case where the image forming apparatus shifts to a sleep state,
   wherein, even in a case where use of InformRequest has been set for a specific notification destination, the predetermined information is transmitted to the specific notification destination by using Trap.

* * * * *